July 23, 1946.　　　　D. BRADBURY　　　　2,404,428
TURBINE APPARATUS
Filed Jan. 31, 1944　　　2 Sheets-Sheet 1
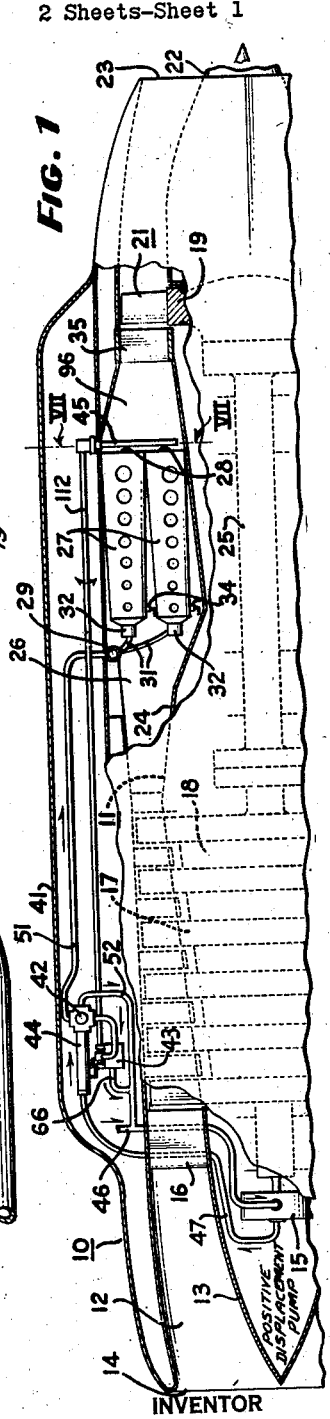
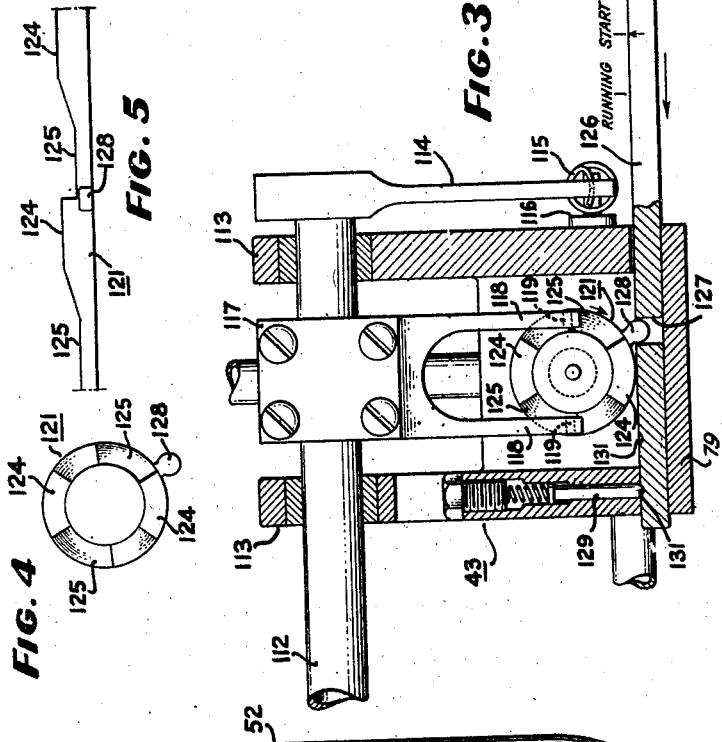
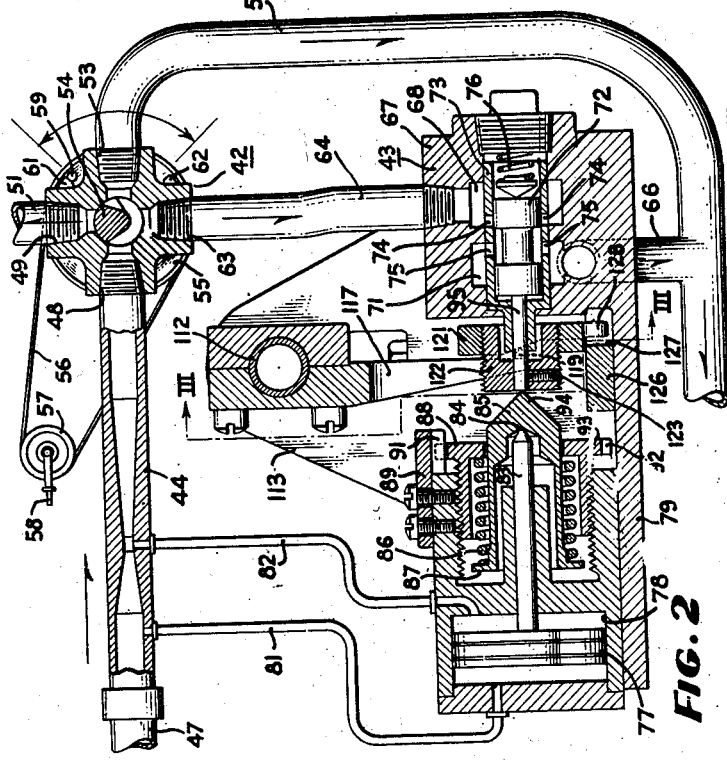
INVENTOR
DONALD BRADBURY
BY
ATTORNEY

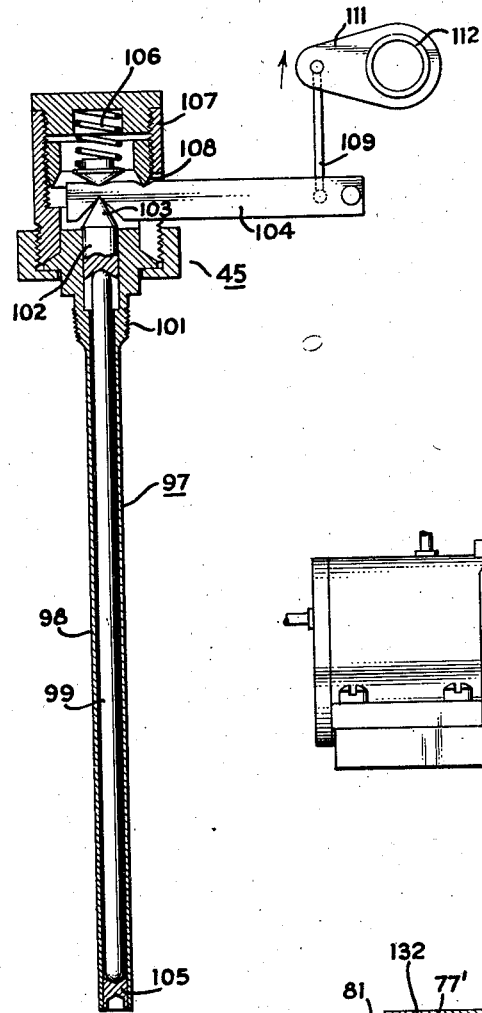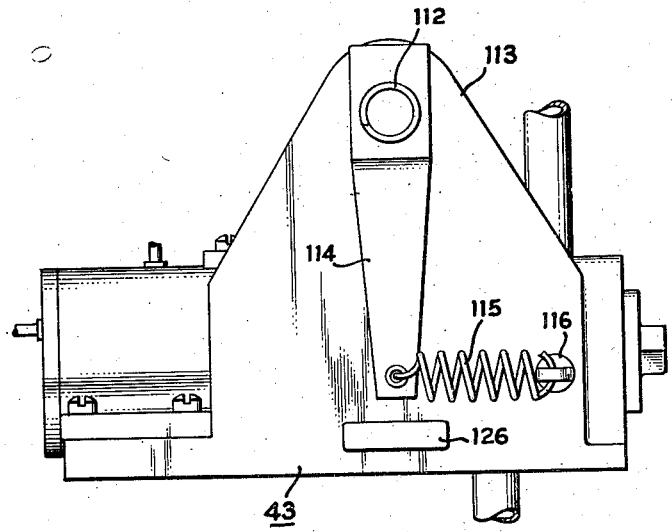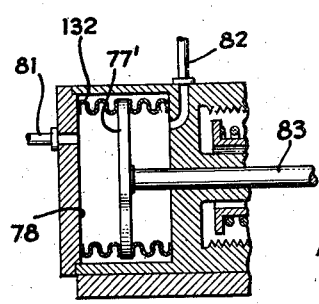

Patented July 23, 1946

2,404,428

UNITED STATES PATENT OFFICE 2,404,428

TURBINE APPARATUS

Donald Bradbury, Prospect Park, Pa., assignor to Westinghouse Electric Corporation, East Pittsburgh, Pa., a corporation of Pennsylvania Application January 31, 1944, Serial No. 520,565

1 Claim. (Cl. 60—41)

This invention relates to power plants and particularly to a control system for protecting a gas turbine power plant from overspeeding and from excessive temperatures, and it has for an object to provide an improved device of the character set forth.

The present invention, while not limited thereto, is particularly adapted to be used to control a gas turbine power plant like that disclosed in the copending application of Stewart Way, Serial No. 482,533, filed April 10, 1943 and assigned to the assignee of the present invention. A power plant of the type disclosed in the mentioned Way application includes an axial-flow air compressor, an air heating apparatus, a gas turbine, and a propulsion jet nozzle all housed in line within a streamlined tubular casing. A plant of this character is particularly suitable for propelling aircraft at high speeds and operates generally as follows: Air enters the forward end of the tubular casing, which is pointed in the direction of flight, and is compressed in the compressor, the compressed air is then heated in the heating apparatus by the combustion of fuel supported by the compressed air. The resulting motive fluid comprising the products of combustion and the excess compressed air drives the turbine and is then discharged through the propulsion nozzle as a jet, the reaction of which serves to propel the aircraft. The turbine extracts at least sufficient power from the motive fluid to drive the compressor and auxiliaries. The fuel is supplied to the air heating apparatus, under the control of a throttle valve, by means of a positive displacement pump which is preferably driven by the turbine.

In the copending application of Donald Bradbury et al., Serial No. 520,564, filed January 31, 1944 and assigned to the assignee of the present invention, there is disclosed a control which automatically prevents dangerous overspeeding of the turbine by limiting the rate at which fuel is supplied to the air heating apparatus. However, it is important also to prevent the temperature of the motive fluid entering the turbine from exceeding a safe value. In accordance with the present invention, a single control valve is provided which regulates the rate at which fuel is supplied to the air heating apparatus and which is actuated to reduce the rate of flow of fuel in response to overspeeding of the turbine and excessive temperature of the motive fluid entering the turbine.

It is, accordingly, a further object of the invention to provide means for limiting the rotational speed of a gas turbine and to prevent the motive fluid entering the turbine from exceeding a predetermined safe value.

These and other objects are effected by the invention as will be apparent from the following description and claim taken in connection with the accompanying drawings, forming a part of this application, in which:

Fig. 1 is a side elevational view of a gas turbine power plant in which the present invention has been incorporated, a portion of the outer casing structure being broken away to show certain details of construction;

Fig. 2 is an enlarged view of the control apparatus, the parts thereof being shown in section for the sake of clearness;

Fig. 3 is a vertical sectional view taken substantially on the line III—III of Fig. 2;

Fig. 4 is an elevational view of a cam forming a part of the control valve;

Fig. 5 is a developed side elevational view of the cam shown in Fig. 4;

Fig. 6 is a side elevational view of the control valve looking from the right of Fig. 3;

Fig. 7 is an enlarged vertical sectional view taken substantially on the line VII—VII of Fig. 1 and showing in detail the temperature-responsive device; and Fig. 8 is a sectional view of a portion of the control valve illustrating a modified construction thereof.

The power plant shown in Fig. 1 comprises in general an outer tubular casing structure 10, open from end to end and having a central core 11 providing with the casing an annular flow passage 12 which, if the plant is to be used for propelling an airplane, is adapted to extend fore and aft with respect to the airplane. The central core structure 11 is supported by the outer casing structure along its longitudinal axis and includes a hollow fairing cone 13 defining with the forward or left end, as viewed in Fig. 1, of the casing 10 an air inlet 14. The fairing cone 13 houses a fuel pump, generally indicated 15, and other auxiliaries (not shown) and is supported from the casing 10 by hollow compressor guide vanes 16.

The core 11 also includes a rotor 17 of an axial-flow compressor 18, the fixed blades of which are carried by the casing 10, a rotor 19 of a gas turbine 21 and a longitudinally adjustable conical tailpiece 22 which defines with the rear end of the casing 10 an adjustable propulsion nozzle 23.

The intermediate portion of the core structure between the compressor 18 and the turbine 21 comprises an inner tubular wall structure 24 which houses a shaft 25 connecting the turbine rotor 19 and compressor rotor 17. The inner wall structure 24 defines with the casing 10 an annular chamber 26 connecting the compressor blade passage and the turbine blade passage.

The chamber 26 is provided with suitable air heating means, such as shown in the copending application of Way et al. Serial No. 511,468, filed November 23, 1943 for heating the air compressed by the compressor. In the embodiment shown, a plurality of perforated, tapered burner tubes 27 are mounted in the annular chamber 26 with their large open ends 28 directed downstream. Fuel is supplied to the burner tubes 27 from a manifold 29, connected to a fuel supply as hereinafter described, and is fed through branch pipes 31 to atomizing nozzles 32 extending into the burner tubes. Suitable means, including spark plugs 34 extending into the burner tubes, are provided for igniting the air-fuel mixture in the burner tubes.

The present invention is not concerned with the specific design of the apparatus thus far referred to, although it is preferably constructed in accordance with the disclosure of the mentioned Way and Way et al. applications.

The power plant operates substantially as follows:

Air enters the casing 10 at the inlet 14, is compressed by the compressor 18, and flows into the annular chamber 26 which may function as a diffuser to effect further compression. The compressed air then passes through the openings in the walls of the burner tubes 27 and mixes with the atomized fuel supplied by the nozzles 32. The air and fuel mixture is ignited by the spark plugs 34 and burns steadily thereafter. The motive fluid comprising the products of combustion and the excess air flows from the burner tubes 27 and is directed by fixed guide vanes or nozzles 35 into the blade passage of the turbine rotor 19. The turbine 21 extracts at least sufficient energy from the motive fluid to drive the compressor 18, pump 15 and other auxiliary apparatus that may be housed in the fairing cone 14. The spent gases leaving the turbine are discharged through the propulsion nozzle 23 at a high velocity so that the remaining energy in the motive fluid is available to propel the aircraft. The tailpiece 22 is preferably axially movable with respect to the casing 10 so that the back pressure on the turbine and the jet effect produced by the nozzle may be varied.

The present invention is particularly concerned with maintaining the turbine speed and the temperature of the motive fluid entering the turbine within safe limits by regulating the fuel supplied to the burners 27.

The speed and temperature controlling apparatus which regulates the fuel supply may conveniently be housed within a tunnel 41 formed in the top of the casing 10, which tunnel also houses lubricating and fuel oil pipes and ignition wires.

The fuel supply system for the burner tubes comprises the pump 15, which is of the constant displacement type and driven by the turbine so that its output is independent of pressure and depends only on the rotational speed of the turbine shaft, a manually adjusted throttle valve 42, of the by-pass type, and a control valve 43 which, when open, also by-passes fuel to the inlet side of the pump 15 to reduce the amount of fuel going to the burners. As will appear later, the control valve 43 is actuated by the differential in pressure between the inlet and the throat of a Venturi tube 44 interposed between the outlet of the pump 15 and the throttle valve 42 and is also actuated by a temperature-measuring device generally indicated 45. It is to be understood that the control valve 43 may be actuated by the pressure difference between the throat and exit of the Venturi tube 44, if desired.

The rate of flow of fuel to the burners is determined by the pressure drop across the atomizing nozzles 32. This pressure drop is controlled by the total resistance to flow of the constant volume of fuel output of the pump 15 and is determined by the area of the nozzles plus that of the throttle valve by-pass. Absolute pressure in the combustion chamber varies widely depending on operating conditions, i. e. pressure ratio and atmospheric pressure. Thus the pressure in the fuel supply system fluctuates over a range from near atmospheric pressure to the rated pressure of the pump. In the particular embodiment shown, the maximum pressure necessary for maximum flow through the burner nozzles, at maximum pressure in the combustion chamber, is the maximum rated flow of the pump. Thus the present control device as it relates to limiting the rotational speed of the turbine must have a very small total pressure drop as well as be independent of the pressure level.

The Venturi tube 44 satisfies both of these last-mentioned requirements. The total output of the pump passes through the Venturi tube and by measuring the pressure drop from the inlet to the throat thereof, which is a function only of the volume of the fuel flowing therethrough, a measure of the speed of the turbine shaft is obtained since the speed of the turbine determines the pump output. This pressure drop in the Venturi tube is used to control the flow of fuel to the burners, so that when the speed reaches a predetermined maximum, fuel is by-passed by the control valve from the outlet of the pump to the inlet thereof and in this way prevents the turbine from exceeding this predetermined speed.

Similarly, the control valve is actuated by means of a suitable temperature-responsive mechanism to reduce the amount of fuel flowing to the burners in the event that the motive fluid discharging from the burners attains a temperature which might cause damage to the turbine. By reducing the rate of flow of fuel to the burners under this condition, a corresponding lowering of the temperature of the motive fuel is obtained.

The fuel, such as gasoline, for the burner tubes 27 flows from a suitable tank (not shown) carried by the aircraft into a main supply pipe 46 to the inlet side of the pump 15. The outlet or discharge side of the pump is connected by means of a pipe 47 to the Venturi tube 44, which in turn is connected to inlet 48 of the four-way, rotary throttle valve 42. One outlet 49 of the valve 42 is connected by a pipe 51 to the manifold pipe 29 of the burner tubes.

Manual regulation of the rate of flow of fuel to the burner tubes to vary the speed of the turbine is effected by adjusting the throttle valve 42 to by-pass more or less of the fuel flowing into the inlet 48 to the inlet of the pump by means of a pipe 52 leading from a second outlet 53 of the throttle valve to the pump inlet pipe 46.

The throttle valve 42 comprises a valve body in which a rotatable valve member 54 is received. The valve member is manually rotated, to regulate the amount of oil flowing to the burners and through the by-pass pipe 52 by suitable means, such as the wheel 55 fixed thereto and connected by a cable 56 to a pulley 57, to which is fixed a hand throttle lever 58. The throttle lever 58 is located for convenient manipulation by the pilot of the aircraft.

In Fig. 2, the throttle valve 42 is shown in closed position so that all of the fuel is by-passed or returned to the pump 15 through pipe 52. In this position, a pin 59 carried by the wheel 55 engages a stop 61 fixed on the valve body. The valve is fully opened when the pin 59 engages a second stop 62 on the valve body. It will be noted that from closed position to fully open position of the throttle valve, a third outlet 63 of the valve body always remains open.

The outlet 63 is connected by a pipe 64 to the control valve 43, which, in turn, communicates through a pipe 66 and pipes 52 and 46 to the inlet of pump 15. If desired, the outlet 63 may be dispensed with and the pipe 64 connected to the outlet of the Venturi tube 44. The control valve 43 is normally closed but is opened, as will appear later, to by-pass fuel flowing into the throttle valve 42 and thereby reduce the amount of fuel flowing to the burners in the event overspeeding of the turbine or excessive temperature of the motive fluid occurs.

The valve 43 comprises a valve body 67 having an annular chamber 68 into which the pipe 64 discharges and a second annular chamber 71 which communicates with the outlet pipe 66. Communication between the chambers 68 and 71 and, therefore, between the inlet and outlet pipes 64 and 66 is controlled by means of a valve member 72 which is slidable in a sleeve 73 in a central bore of the valve body 67. The sleeve 73 is provided with ports 74 and 75 connecting the chambers 68 and 71, respectively, with the interior of the sleeve. The valve member 72 is biased to the valve-closing position by means of a compression spring 76 so that it normally closes ports 74.

The valve member 72 is adapted to be shifted to the right, as viewed in Fig. 2, to gradually uncover the ports 74 and thereby by-pass fuel from the Venturi tube to the inlet side of the pump and reduce the amount of fuel flowing to the burners in the event of over-speeding of the turbine or overheating of the motive fluid entering the turbine.

Overspeeding of the turbine is controlled by means of a piston 77 housed within a cylinder 78 mounted on a base 79 common to the valve body 67. The piston 77 is shifted to the right, as viewed in Fig. 2, when the rate of flow of fuel through the Venturi tube exceeds a predetermined value.

Pipes 81 and 82 extend from the inlet and throat, respectively, of the Venturi tube 44 and open into the cylinder 78 on opposite sides of the piston 77. The piston is provided with a stem 83 having a pointed end 84 adapted to engage a spring-biased member 85 which is slidable in the cylinder block. The member 85 is biased to the left, as viewed in Fig. 2, by means of a compression spring 86, one end of which engages a flange 87 on the member 85 while the other end engages an internally-flanged nut 88 which is adjustably threaded into the cylinder block. From this structure, it will be clear that by turning the nut 88 into or out of the cylinder block, the amount of pressure acting on the piston 77 and necessary to shift it to the right may be readily varied. The nut 88 is locked in adjusted position by means of a dog 89 removably secured to the cylinder block and having a flange 91 adapted to engage any one of a plurality of notches 92 provided in an external flange 93 of the nut.

The outer pointed end 94 of the member 85 is adapted to engage a stem 95 on the valve member 72 so that movement of the piston 77 is transmitted to the valve member.

The overspeed control operates as follows:
When the rate of flow of fuel through the venturi reaches a value resulting in a pressure drop from the inlet to the throat thereof sufficient to displace the piston 77 to the right against the force exerted by the compression spring 86 and the basing spring 76, the valve stem 95 is engaged by the pointed end 94 of member 85 causing the valve member 72 to be shifted to the right and gradually uncover the ports 74. This provides direct communication between the by-pass pipes 64 and 66, thus reducing the amount of fuel flowing to the burners and thereby effecting a reduction in the speed of the turbine since its speed is dependent upon the energy added to the compressed air by the burning fuel.

The valve member 72 is also shifted to the right to uncover the ports 74 in the event the temperature of the motive fluid entering the turbine exceeds a predetermined value. This is accomplished by means of suitable temperature-responsive means which may be located between the burner tubes 27 and the turbine 21.

Any suitable temperature-responsive means may be employed which will actuate the control valve 43 and, therefore, the invention is not to be construed as limited to the particular type disclosed. Referring particularly to Fig. 7, there is shown a temperature-responsive device, generally indicated 97, which comprises a high temperature metal tube 98 having a quartz rod 99 received therein. The tube 98 and rod 99 are suspended from the outer casing 10, the upper end 101 of the sleeve 98 being threaded and received in a threaded hole in the casing. The invention is not restricted to the employment of a metal tube and quartz rod since any high temperature resisting materials having different coefficients of expansion may be employed.

The upper end of the quartz rod 99 is engaged by a freely slidable member 102 having a pointed upper end 103 providing a knife edge on which a lever 104 is fulcrumed. The lever 104, member 102 and quartz rod 99 are biased downwardly, so that the quartz rod engages the bottom 105 of the tube 98 by means of a compression spring 106 disposed within a housing 107 secured to the upper end of the tube 98. A second knife edge 108 spaced laterally from the knife edge 103 engages the lever 104 at the side opposite the knife edge 103.

The outer end of the lever 104 is connected by a link 109 to a crankarm 111 carried by a torque tube 112 extending from the temperature-responsive device to the control valve 43.

As the quartz rod 99 and metal tube 98 are heated, the tube, having a higher coefficient of expansion than the rod, increases in length at a greater rate than the quartz rod so that the rod moves downwardly into the tube, and the lever 104, maintained in engagement therewith by the spring 106, swings in a counterclockwise direction, as viewed in Fig. 7, about knife edge 108. Thus, under the conditions mentioned, the lever 104 will cause the crankarm 111 to turn the torque tube 112 in a clockwise direction as viewed in Fig. 7.

This rotation of the torque tube is transmitted to the control valve 43 by means of mechanism shown in Figs. 2 to 6, inclusive. The forward end of the torque tube is journaled in brackets 113 carried by the base 79 of the control valve 43. The end of the torque tube has fixedly secured thereto an arm 114 to which is fixed a tension spring 115 attached to the bracket 113 at 116. The spring 115 cooperates with the compression spring 106 to bias the quartz rod 99 against the bottom of tube 98.

A second arm 117 is rigidly clamped to the torque tube between the brackets 113 as shown in Fig. 3. The arm 117 is bifurcated providing arms 118, the lower ends of which straddle the valve stem 95 and terminate substantially at an axial plane of the stem. The face of the lower ends of these arms 118, at the side opposite that visible in Fig. 3, is provided with cam follower fingers 119 as shown by dotted lines in Fig. 2, adapted to engage the face of a cam 121. The cam 121 is in the form of a disc and is threaded onto an externally-threaded sleeve 122 which is fixed by means of a set screw 123 to the valve stem 93. The cam 121 is adjustable along the sleeve 122, so that its position with respect to the cam follower fingers 119 may be changed in calibrating the temperature control apparatus.

Referring to Figs. 4 and 5, it will be noted that the cam 121 is provided with diametrically-opposed high surfaces 124 and low surfaces 125. In normal operation, the cam is positioned so that the fingers 119 of the arm 117 are aligned with and adapted to engage the high surfaces 124. The apparatus is calibrated so that when a predetermined temperature is reached in the annular chamber 96, the arm 117 is moved to a position to engage the high surfaces 124 and effect movement of the valve member 72 to the right as viewed in Fig. 2, to uncover the ports 75 and thereby provide by-passing of the fuel around the burners. For example, in gas turbines as now known, the temperature-responsive device may be calibrated to effect opening of the ports 74 when the temperature in the chamber 96 reaches 1200° F.

However, it was found necessary to change the temperature limit at which the temperature-responsive device opened the control valve when starting the gas turbine so that at starting and for a short interval thereafter, the temperature of the motive fluid will reach a higher value such as 1500° F. before the temperature-responsive device 45 opens the control valve 43. This is accomplished by shifting the cam 121 to bring the low surfaces 125 in line with the cam follower fingers 119 so that greater travel of the arm 117 is required before the temperature-responsive device begins to open the ports 74.

As shown particularly in Fig. 3, this adjustment of the cam for the starting period of the gas turbine is effected by means of a slide rod 126 having an opening 127 therein which receives a lug 128 projecting from the periphery of the cam 121.

In Figs. 2 and 3, the apparatus is shown in starting position with the slide rod 126 pulled out so that the low surfaces 125 of the cam are in a position to be engaged by the cam follower fingers 119. After the turbine has been started, the cam is manually shifted by means of the slide rod 126 to bring the high surfaces 124 into controlling position. A spring-pressed detent 129 mounted in one of the brackets 113 may be provided for selective engagement with notches 131 provided in the slide rod to maintain the slide rod and cam in either of its positions.

In Fig. 8, there is shown a slight modification of the control valve 43 in which the piston 77 is replaced by a piston 77' to which is secured flexible bellows 132. The bellows 132 together with the piston 77' and the end walls of the cylinder 78 define expansible chambers into which the pipes 81 and 82, leading from the inlet and throat respectively of the Venturi tube, discharge. Except for this difference, the modified control valve is identical with and operates like that shown in Fig. 2.

While the invention has been shown in several forms, it will be obvious to those skilled in the art that it is not so limited, but is susceptible of various other changes and modifications without departing from the spirit thereof, and it is desired, therefore, that only such limitations shall be placed thereupon as are specifically set forth in the appended claim.

What is claimed is:

A system for controlling the supply of fuel to the combustion apparatus of a gas turbine or the like, comprising a constant displacement pump, a throttle valve having an inlet and a plurality of outlets, means including a Venturi tube connecting the outlet of the pump to the inlet of the throttle valve, means for connecting one of said valve outlets to the combustion apparatus for supplying fuel thereto, means for connecting a second valve outlet to the inlet of the pump, said valve including an adjustable valve member for by-passing a selectable amount of fuel through said second outlet to the pump inlet for varying the rate of flow of fuel to the combustion apparatus, a control valve communicating with the discharge end of said Venturi tube and opening to the inlet of said pump, said control valve including a valve member for regulating the flow of fuel therethrough, means for positioning said valve member in accordance with the pressure differential between the inlet and throat of said Venturi tube and arranged so that an increase in the pressure differential between the inlet and throat of the Venturi tube tends to open said control valve, and means responsive to the temperature of the motive fluid generated by said combustion apparatus for positioning said valve member in accordance with the temperature of said motive fluid and arranged so that an increase in temperature of said fluid above a predetermined value tends to open said control valve.

DONALD BRADBURY.